Oct. 2, 1934.  F. C. FULCHER  1,975,393
APPARATUS FOR STRAINING OR FILTERING LIQUIDS
Filed April 1, 1932
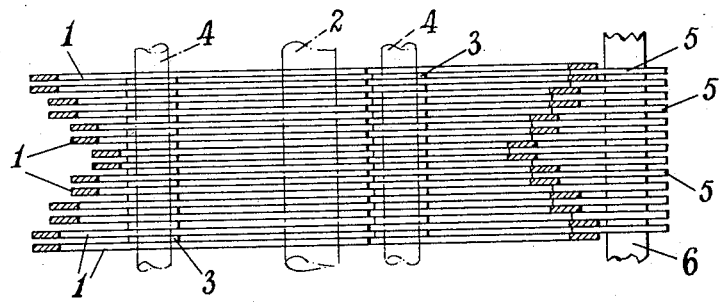
Fig. 1.
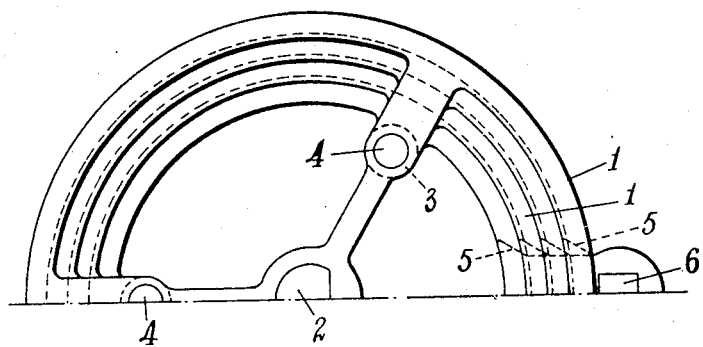
Fig. 2.
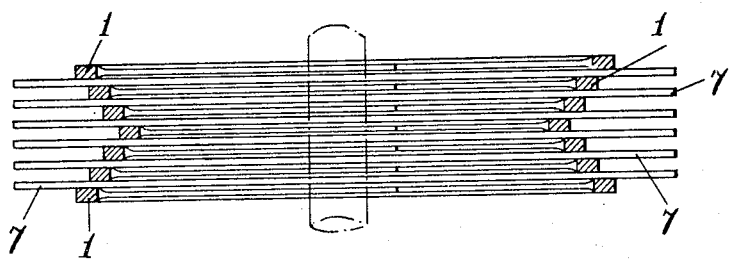
Fig. 3.
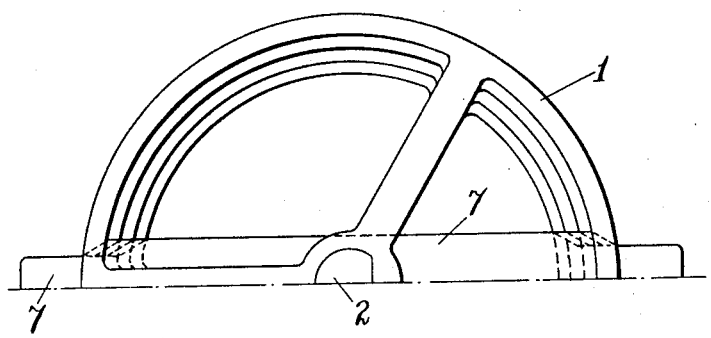
Fig. 4.
Fig. 5.  Fig. 6.  Fig. 7.  Fig. 8.
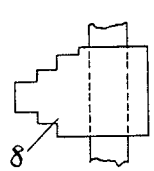
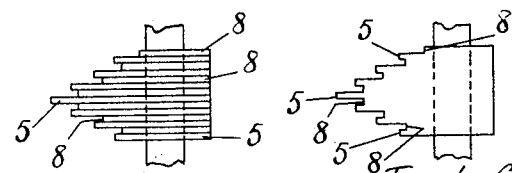
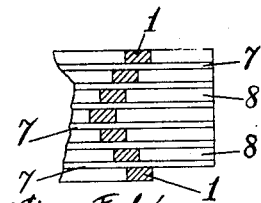
INVENTOR Frank Christian Fulcher
BY ATTORNEYS Nathan, Bowman + Helferich Patented Oct. 2, 1934

1,975,393

UNITED STATES PATENT OFFICE 1,975,393

APPARATUS FOR STRAINING OR FILTERING LIQUIDS

Frank Christian Fulcher, Purley, Surrey, England

Application April 1, 1932, Serial No. 602,565
In Great Britain May 22, 1931

2 Claims. (Cl. 210—152)

The present invention relates to improvements in or relating to filtering or fine straining apparatus for fluids of the kind in which the fluid is passed by a straight-through flow through fine slots, formed between a series of filtering members, scraper blades being provided which permanently engage the slots. The scraper blades and the straining walls are relatively movable for the purpose of freeing the slots from accumulated dirt and other foreign matter. The fine slots may be formed in various ways, one example being a plurality of thin discs spaced apart on a carrier either by washers or by pressed-up portions of the discs, so as to form peripheral straining slots at their edges. Types of fine straining apparatus to which the present invention relates are to be found in the specification of my prior Patent No. 1,414,120.

According to the present invention, apparatus of the class above described is constructed with the filtering members set in staggered relationship so that a graduated trapping or intercepting of any foreign matter contained in the liquid is obtained, though the actual filtering slot is between two parallel members.

Additional edge scrapers for the members may be provided, to ensure the more complete cleaning of the same.

Examples of carrying the present invention into practice are illustrated in diagrammatic form in the accompanying drawing.

In the drawing:—

Fig. 1 is a part sectional elevation, and

Fig. 2 a plan of one form of filtering or fine straining apparatus.

Figs. 3 and 4 are similar views of another form, while

Figs. 5 to 8 are detail views referred to later.

Referring to Figs. 1 and 2 the discs 1 in staggered or step-wise formation are mounted on a rotatable shaft 2 and spaced apart by washers 3 mounted on rods 4. The cleaning blades 5 are of different lengths so as to co-operate with the appropriate pairs of discs. The blades 5 are mounted on a spindle 6, or the blades may be grouped on separate spindles located around the discs.

A slotted cylindrical strainer is shown by Figs. 3 and 4 comprising a series of circular discs 1 made up as a pile in staggered or stepped relationship and blades 7 passing into the slots between the discs, the blades being so proportioned and related to the discs as to form cleaning or scraping blades. The blades may be fixed and the pile movable or vice versa, or both the discs and the blades may be rotated. As shown the blades pass into slots between the discs, the latter being mounted on a rotatable spindle 2, the blades being prevented from rotating in any suitable way e. g. by being secured to the filter casing. In another form the casing and the scraper blades may be rotated and the discs held stationary.

In the example shown it will be noted that a series of contacting members or discs are arranged in the form of a pile, having the two extreme outside members of the same length or diameter, the next opposite pair being of lesser length or diameter, and so on, to the middle of the pile.

The liquid to be filtered may either enter through the periphery of the pile and escape through a central opening or it may take a reverse course. In either case it has a straight-through flow between two adjacent filtering members.

Additional scrapers for the edges of the discs may be provided. Examples thereof are illustrated in Figs. 5 to 8 inclusive. When these additional scrapers 8 are used these operate so as to scrape the external edges of the discs.

The additional scrapers 8 may be fixed to or adjacent the scrapers 5, as shown in Fig. 6. Fig. 7 shows a modification of Fig. 6 in which the scrapers 5 and 8 are in the form of a solid block. Fig. 5 shows an additional edge scraper 8 which is located away from the slot scrapers 5. Fig. 8 shows the additional scrapers 8 applied to the filter construction of Fig. 3.

By the present invention multiple degrees of trapping or intercepting are obtained.

The movement of the members or discs and/or the cleaning blades may be effected by hand or by mechanical means in any suitable manner. The scraper blades may be of any suitable form.

Filters or fine strainers according to the present invention may conveniently take the form of rectangular or cylindrical ranks or piles, in single or multiple and in parallel or in series as desired.

It is to be understood that the slots in the apparatus to which this invention relates are fine slots, slots of $$\frac{2''}{100}$$

or less width for example serving well for the fine straining of such liquids as petrol, paraffin, fuel oil, lubricating oil, oil paint, varnish, etc.

I claim:—

1. Filtering or fine straining apparatus for fluids, comprising a series of spaced apart parallel members, a mounting for said members, the fluid having a straight through flow through fine slots formed between said members, narrow scrapers projecting permanently into said slots for cleaning purposes, additional scrapers for the edges of said members, a common mounting for said narrow and additional scrapers, the members and the scrapers having a relative movement for cleaning, and the members being set in staggered relationship so that a graduated trapping or intercepting of any foreign matter contained in the fluid is obtained as this passes through the filter.

2. Filtering or fine straining apparatus for fluids, comprising a series of spaced apart parallel members, a mounting for said members, the fluid having a straight through flow through fine slots formed between said members, narrow scrapers projecting permanently into said slots for cleaning purposes, additional scrapers for the edges of said members, said narrow scrapers and additional scrapers being in the form of a solid block, a mounting for said scrapers, the members and the scrapers having a relative movement for cleaning, and the members being set in staggered relationship so that a graduated trapping or intercepting of any foreign matter contained in the fluid is obtained as this passes through the filter.

FRANK CHRISTIAN FULCHER.